United States Patent [19]
Smith, Sr. et al.

[11] 3,992,034
[45] Nov. 16, 1976

[54] MULTIPURPOSE KNOCKDOWN HANDCART

[76] Inventors: Harvey J. Smith, Sr., 1211 Buckingham Road; John T. Lipford, 303 Sunset Drive, both of Greensboro, N.C. 27408

[22] Filed: Aug. 22, 1975

[21] Appl. No.: 606,759

[52] U.S. Cl. ............................... 280/654; 248/98
[51] Int. Cl.² ................................... B62B 11/00
[58] Field of Search ........... 280/47.24, 47.26, 47.23, 280/36 C, 652, 654; 248/98, 97, 99, 100, 101

[56] References Cited
UNITED STATES PATENTS

| 3,603,542 | 9/1971 | Grille | 248/98 |
| 3,754,771 | 8/1973 | Shagoury | 280/36 C |
| 3,893,699 | 7/1975 | Morris | 280/36 C |

*Primary Examiner*—Robert R. Song

[57] ABSTRACT

A multipurpose knockdown handcart a U-shaped hand supporting portion and a U-shaped load carrying portion connected together and supported by load carrying wheels with a removable bag retaining member releasably supported thereon.

4 Claims, 9 Drawing Figures

MULTIPURPOSE KNOCKDOWN HANDCART

BACKGROUND, OBJECTIVES AND ADVANTAGES OF THE INVENTION

Basically, wheeled handcarts have been employed in industry, offices and homes for many years and are generally constructed of welded tubular steel members and a solid sheet metal load supporting platform. Many of the prior handcarts are costly, heavy, and permanently assembled making them difficult to store, disassemble and be readily usable by women and children. Furthermore, most prior handcarts lack accessories for multiple purposes other than using the load-bearing platform for transporting the load to be moved.

One of the objectives of this invention is to provide a multiple purpose knockdown, lightweight handcart having wheels which may be readily disassembled and assembled.

Another objective of this invention is the provision of a lightweight wheeled handcart having a refuse bag retaining member that is removably connected to the handcart at a centerable level for receiving and collecting various types of refuse including garbage, leaves, newspapers and other material while the bag is retained in an open condition and may be transported on the handcart either in the open condition or in the bag closed or sealed position.

Still another objective of this invention is the provision of a lightweight, multiple purpose handcart which may be readily used for transporting a gargage can, bags of materials and other articles on the load bearing platform.

Other objectives of this invention for a general utility or all purpose handcart for office, home, and lightweight industrial use will become more readily apparent from the accompanying drawings and detailed description of one preferred embodiment of the invention.

DETAILED DESCRIPTION OF DRAWINGS

DETAILED DESCRIPTION OF ONE PREFERRED EMBODIMENT OF THE INVENTION

Figure 1:
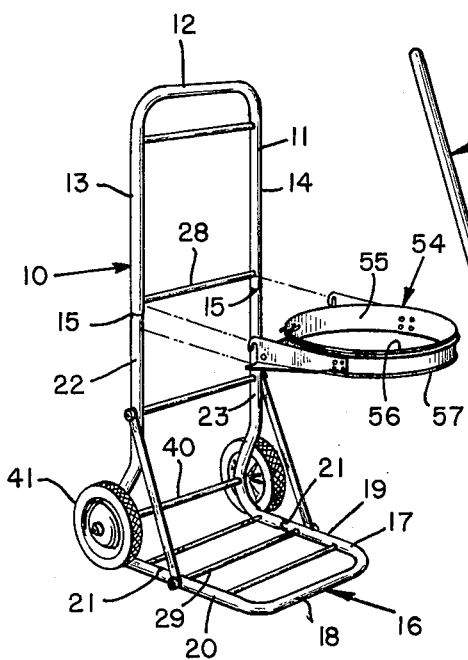
FIG. 1 is a prospective view of a knockdown, lightweight, handcart embodying the invention illustrating a removable bag supporting member in a lowered disconnected position adjacent to the upright legs of the inverted U-shaped handrail.

Referring to FIG. 1, there is illustrated a knockdown, lightweight, multiple purpose handcart 10 having an inverted U-shaped top rail 11 with a horizontal handgrip section 12 and depending legs 13 and 14 terminating at 15.

A load-supporting platform 16 is formed by a U-shaped rail 17 which is provided with a front portion 18 and rearwardly extending leg portions 19 and 20 which terminate at 21. Both U-shaped sections 11 and 16 are preferably made of aluminum tubing, however, other materials may readily be employed, and the terminal sections 15 and 21 need not be swagged depending upon the type of connection for removable or connecting engagement.

Intermediate connecting sections 22 and 23 are laterallyspaced from each other and are fabricated of the same material as the U-shaped sections 11 and 16 but the terminal ends 24 and 26 of member 22, and 25 and 27 of member 23 are swagged to a smaller diameter for telescopingly being received in the ends 15 and 21 of the U-shaped top rail and platform rail members.

Upon insertion of the swagged portions of members 22 and 23 into the U-shaped member ends, crossbars 28 and 29 may be inserted into openings 30 in the depending legs 13 and 14 which will cooperate with the openings 31 in the swagged portions 24 and 25 of the members 22 and 23 for releasably locking the members together by means of the crossbar 28. Similarly, openings 32 are provided in the terminal portions of the legs 19 and 20 of the platform 16 which will cooperate with the openings 33 in the swagged portions 26 and 27 of the members 22 and 23 to be cooperatively locked together by the crossbar 29. The crossbar 28 does not extend outwardly in the U-shaped top rail. However, the crossbar 29 extends through matched openings 32 and 33 in their corresponding members permitting the crossbar 29 to extend beyond the surface of the leg members 19 and 29 cooperatively to receive on the terminal portions 34 of the crossbar 29 the opening 35 on the connecting bar brace 36 before appropriate locking members or push nuts 37 are positioned on the ends 34 of the crossbar 29 locking the brace 36, platform 16 and members 22 and 23 together.

Each of the connecting members 22 and 23 is provided with an arcuate contour 38 intermediate their length and each is provided with an axle opening 39 for cooperatively receiving and bearingly-supporting an axle 40 therethrough. A tired wheel 41 is rotatably mounted on each end 42 of the axle 40 that protrudes outwardly from the arcuate sections 38. Friction or push nuts 42 retain the wheels on the axle 40 although other appropriate fastening means including cotter pins may be employed.

The load-carrying platform 16 may be provided with additional crossbars 43 and 44 which are supported by the members 19 and 20 through suitable openings 45 and 46 that are provided in the tubing the pair of bar braces 36 that are connected to the load-carrying platform as described above extend at an angle upwardly to connect with the crossbar 47 that extends through openings 48 in the members 22 and 23 with the terminal ends 49 of the crossbar 47 extending through the openings 48 to receive the openings 50 in the terminal ends of the brace bars 36 which are then held in position by means of the friction or push nuts 51. An upper crossbar 52 is provided and supported in the vertically extending members 13 and 14 of the inverted U-shaped handrail through openings 53 therein. Crossbars 28 and 52 are suitably positioned to support a bag supporting member 54 that is releasably hooked or otherwise removably attached to one or the other of the bars 28 or 52 depending upon the length of the bag being used.

The bag-retaining support member 54 is provided with a circular rim or hoop 55 with upper and lower flanges 56 and 57. A pair of laterally-spaced hoop-supporting arms 58 is riveted to the perimeter of the hoop and is provided with a crossbar engaging open hoop member 59 which may releasably engage crossbar 28 in the lower position or crossbar 52 in the elevated position. A laterally extending flange 60 in the form of a web for engaging the vertical sections 13 or 14 to provide supporting rigidity to the hoop member engages the tubular section 13 or 14 through the arcuate indentation 61 in the terminal portion of the flange 60.

Figure 2:
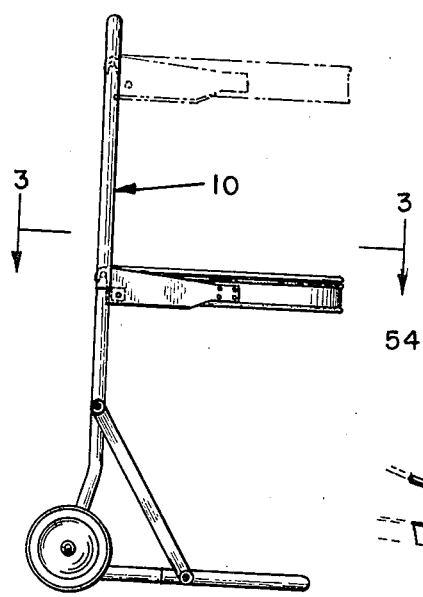
FIG. 2 is a left side elevational view of the handcart of FIG. 1 with the removable bag supporting member connected to the cart in the lower position and shown in outline form in the upper or elevated position on the handcart.
Figure 5:
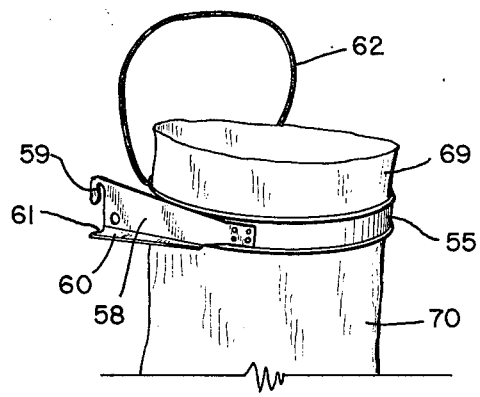
FIG. 5 is a partial prospective view of the removable bag supporting member through which an open top bag is passed before overlapping the rim or hoop and retention thereon.
Figure 6:
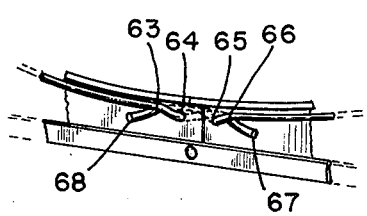
FIG. 6 is a partial rear view of a portion of the bag-supporting rim illustrating the bag-retaining band and band tightening means.
Figure 3:
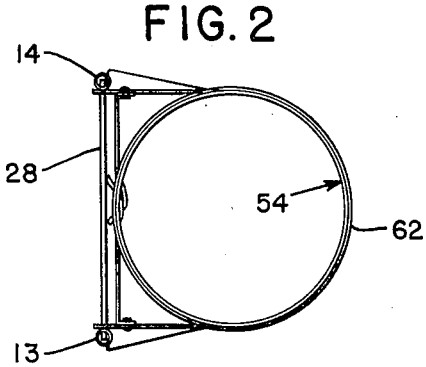
FIG. 3 is a partial transverse plane and sectional view illustrating the connected bag supporting member shown in FIG. 2 taken along the line 3—3 of FIG. 2.
Figure 4:
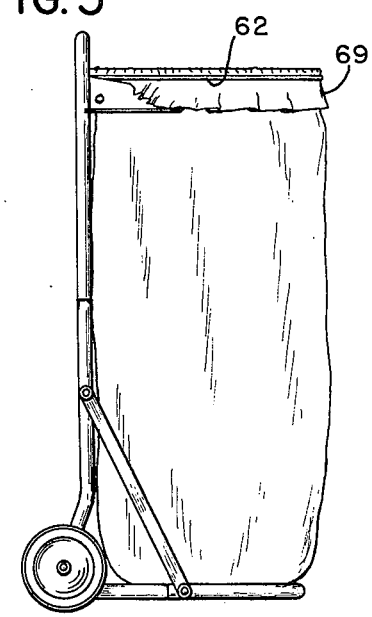
FIG. 4 is a left side elevational view of the handcraft with the removable bag supporting member in the elevated position supporting an open bag thereon.
Figure 9:
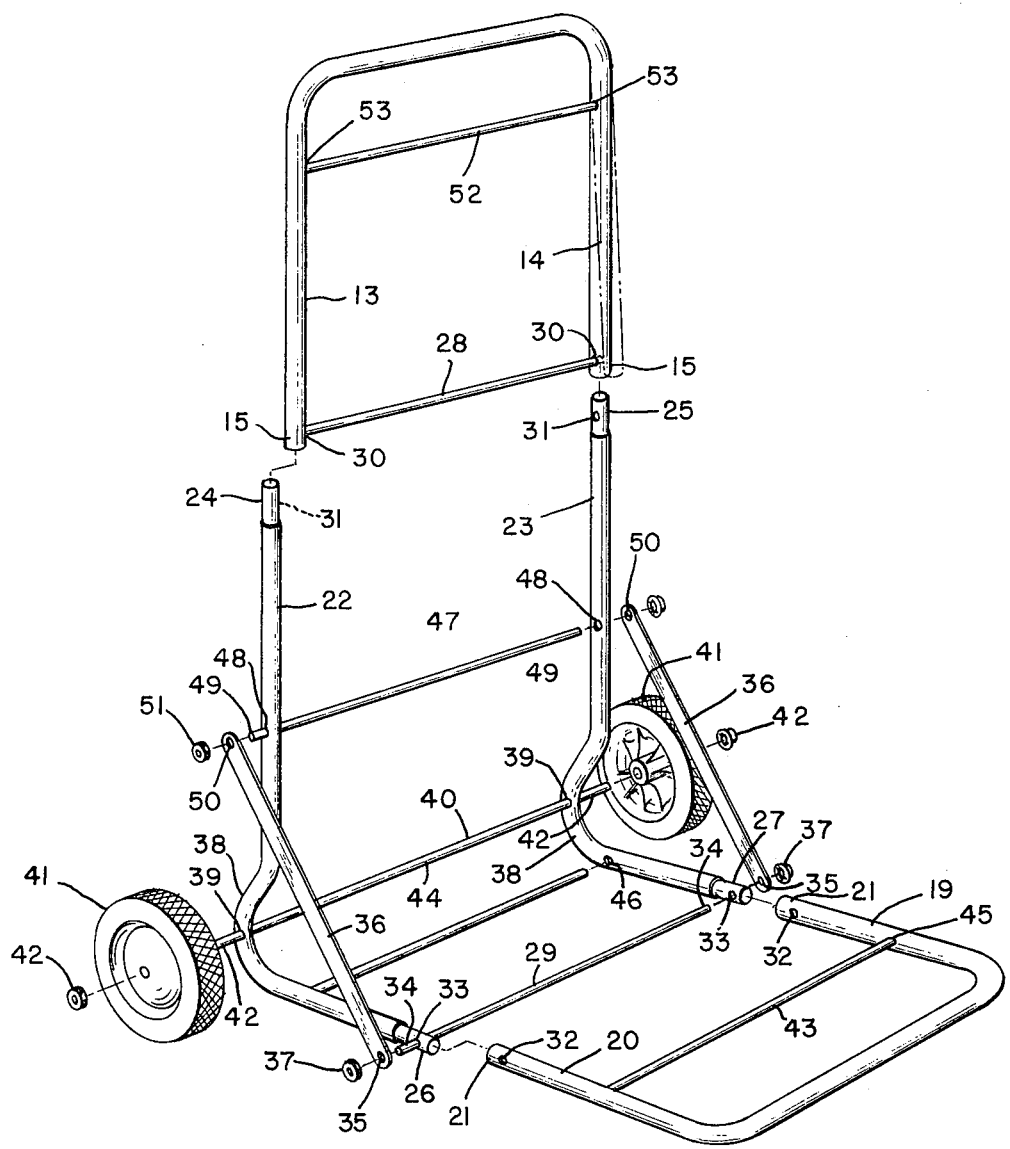
FIG. 9 is an exploded prospective view of the knockdown handcart of FIG. 1 illustrating the articulation of the individual components and their relative positions for assembly.

A flexible, and preferably elastic, band 62 is releasably secured to the bag retaining member 54 for cooperatively retaining the opened end of a bag. The band 62 encircles the perimeter of the hoop 55 beneath the top flange 56. A series of openings 63, 64, 65, and 66 is provided in the hoop 55 for lacing the flexible bag-retaining band 62 in position and for tightening. One end 67 of the band 62 is laced through openings 64 and 66 while the other end 68 is laced through openings 63 and 65 thereby permitting sufficient frictional engagement of the band and the opening to releasably lock the band in position while providing ease of positioning the upper open end 69 of a plastic bag 70 through the internal or inner surface of the hoop, as shown in FIG. 5, with the elastic band 62 released for positioning. The plastic bag 70, at the upper open end 69 is then folded over the exterior of the hoop as shown in FIG. 4, and the band is then positioned over the hoop to retain the bag in position releasably by means of a flexible band 62. The bag retaining member 54 may be positioned in the first or lowered position as shown in FIG. 2 or may be raised to the upper position as shown in outline form in FIG. 2 and in FIG. 4 depending upon the length of the particular bag being utilized.

Figure 7:
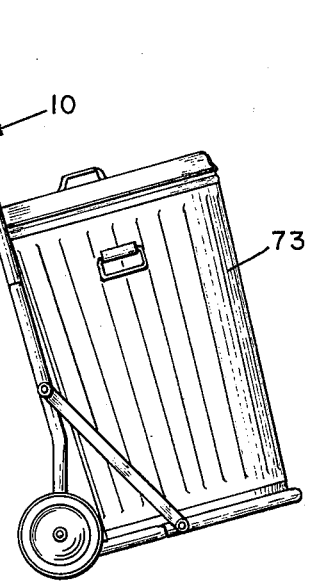
FIG. 7 is a left side elevational view of the handcraft supporting two closed bags on the supporting platform.
Figure 8:
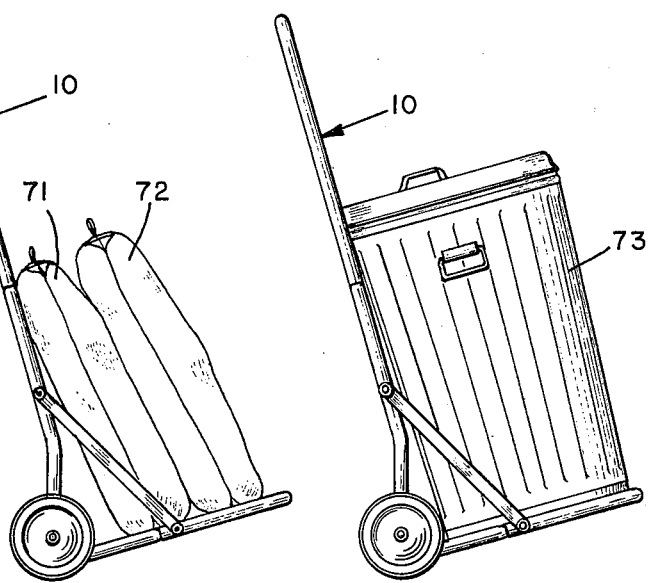
FIG. 8 is a left side elevational view of the handcart shown supporting a garbage can on the load-support platform.

There is shown in FIG. 7, the handcart 10 without the bag retaining member but with 2 bags 71 and 72 that have been closed for transportation to another location in the tilted position. In FIG. 8, there is illustrated the same handcraft 10 being utilized for transporting a garbage can 73 that is positioned on the load-carrying platform without the use of the removable bag-retaining member 54.

Various modifications may be made to the connecting means for the articulated members to provide a compact knockdown handcart which may be shipped with minimum volume and readily assembled as well as modifications may be made to the various types of fastening members and the means for retaining a bag on the bag-retaining member within the scope of the appended claims.

We claim:
1. A multipurpose knockdown handcart comprising: A first inverted U-shaped top rail, a second U-shaped platform rail, means connecting said U-shaped top rail and said U-shaped platform rail, spaced-apart wheels mounted to said connecting means for supporting said hand cart for movement, a bag supporting means, said bag supporting means having a circular hoop, a pair of laterally-spaced arms secured to said hoop, each of said arms having a barengaging hook thereon and a stabilizing flange for engaging said U-shaped top rail, said hoop having a flexible member for releasably retaining a bag on said hoop in open condition, and said hoop having a plurality of openings therein, said flexible member having terminal ends laced in said openings for tightening and locking said flexible member therein while retaining a bag on said hoop.

2. A multiple purpose knockdown handcart as claimed in claim 1, bracing means between said U-shape platform and said connecting means, and at least one crossbar extending transversely on said first inverted U-shaped top rail for releasably supporting said bag supporting means thereon.

3. A multiple purpose knockdown handcart as claimed in claim 1, said first inverted U-shaped top rail, said second U-shaped platform rail, and said connecting means each having telescoping connecting means, and crossbars for releasably locking the telescoping connecting means against displacement after assembly.

4. A multiple purpose knockdown handcart as claimed in claim 1, said second U-shaped platform having a plurality of crossbars for supporting a load placed on said platform.

* * * * *